2,809,892

ZINC BACITRACIN FEED SUPPLEMENT

Francis W. Chornock, Farmersburg, Ind., assignor to Commercial Solvents Corporation, Terre Haute, Ind., a corporation of Maryland No Drawing. Application November 1, 1954, Serial No. 466,236

4 Claims. (Cl. 99—2)

My invention relates to a feed supplement and more particularly it relates to a feed supplement containing the zinc salt of the antibiotic bacitracin and to a method of producing the feed supplement.

For some years there has been extensive study of the need for various nutrients in feed for poultry and livestock. This study has resulted in the evolution of feeds compounded to include all of the ingredients necessary to provide the proper proportions of materials such as, for example, proteins, carbohydrates, minerals, vitamins, etc., as well as the formulation of rations designed for specific feeding purposes. Following the development of rations balanced in essential nutrients, it was found that other substances such as vitamin $B_{12}$ could be included in the rations which would serve as growth promoters and increase the rate at which livestock developed resulting in a larger animal at an earlier age. Recently it has been found that the inclusion of certain antibiotics in feed supplements acts to give an additional growth-promoting effect and aids in producing larger animals at an earlier age than can be done with feed containing only growth promoters such as vitamin $B_{12}$.

Among the antibiotics which have been found useful in feed supplements to provide an additional growth-promoting effect is the antibiotic bacitracin. Bacitracin, even though it is well known to be useful as a feed supplement, has been found to be unstable when stored for extended periods of time. The instability referred to is manifested by a loss in the antibiotic potency of the material, such loss occurring in storage under conditions ordinarily encountered except when special precautions are taken to store the bacitracin at temperatures below room temperature. Such instability as above referred to makes it necessary to introduce feed supplements containing bacitracin into the channels of commerce in many cases with warning cautioning against possible loss in bacitracin potency which is considered to be a measure of bacitracin content.

I have now discovered a new bacitracin-containing feed supplement which feed supplement can be stored at usual storage temperatures and at elevated temperatures as high as about 60° C. (140° F.) over extended periods of time without loss of bacitracin potency, and which new feed supplement is readily obtainable and possesses the growth-promoting property of a feed supplement containing ordinary bacitracin.

My new invention is a feed supplement containing as its essential active ingredient the antibiotic bacitracin in the form of its zinc salt. The essential active ingredient of my new composition can be mixed with diluents which can or cannot have nutritive value and which can or cannot be active as far as growth-promoting effect is concerned.

Zinc bacitracin can be prepared by any convenient method such as by precipitation from an aqueous solution by first dissolving ordinary bacitracin in water at about pH 5.0, adding zinc and adjusting the pH to about 7.0 to precipitate the zinc bacitracin. Zinc bacitracin can also be produced from an acidified aqueous concentrate of bacitracin by adding an aqueous solution of a water-soluble zinc salt such as zinc chloride, zinc sulfate, zinc acetate, etc., then raising the pH to precipitate zinc bacitracin from the resulting solution.

When the zinc salt of bacitracin is employed in purified form to supplement a feed, I prefer to employ a diluent with the zinc bacitracin incorporated therein to facilitate mixing the supplement in the feed. Some diluents which I have used include ordinary feed ingredients such as soy flour, finely ground wheat middlings, corn meal, etc. Other growth-promoting materials such as, for example, vitamin $B_{12}$, etc. may be incorporated in the diluent with the zinc salt of bacitracin.

As indicated above, zinc bacitracin can be combined with inert or nutrient diluents to obtain the feed supplement which is desired. However, I prefer to prepare the feed supplement by forming the zinc salt of bacitracin by the reaction of zinc with bacitracin produced by culturing a bacitracin-producing strain of the organism *Bacillus subtilis* in an aqueous nutrient medium and then removing precipitated zinc bacitracin and water-insoluble solids resulting from the culture of the organism in the aqueous nutrient medium and drying the same to obtain the feed supplement. In producing the feed supplement by this method, we add a water-soluble zinc salt such as, for example, zinc chloride, zinc sulfate, zinc acetate, etc., to the nutrient medium in which has been cultured a bacitracin-producing strain of the organism *Bacillus subtilis* and which nutrient medium contains bacitracin produced by the organism in solution. Upon addition of the water-soluble zinc salt, the zinc salt of bacitracin is precipitated and the precipitated zinc salt of bacitracin and the water-insoluble solids produced during the fermentation are then removed by any convenient means such as, for example, filtration, centrifugation, etc. The mixture of zinc bacitracin and the water-insoluble solids from the fermentation is then dried by any convenient means such as, for example, drum drying, air drying, etc., to obtain the dry, solid zinc bacitracin-containing feed supplement. In producing the feed supplement by this method, I have found that I can avoid some loss of bacitracin by concentrating the liquid from which the zinc bacitracin and water-insoluble fermentation solids have been removed and adding the concentrate to the mixture of zinc bacitracin and water-insoluble fermentation solids prior to drying and then drying the resultant mixture.

In producing my new zinc bacitracin feed supplement by the above-described method, I add the water-soluble zinc salt to the bacitracin-containing nutrient medium in an amount sufficient to form a solution of a concentration of at least about 1% by weight of the water-soluble zinc salt. Amounts above about 1.0% do not appear to further increase the bacitracin precipitated while amounts below about 1.0% steadily decrease the bacitracin precipitated as the amount of water-soluble zinc salt decreases, only about 25 to 30% of the bacitracin being precipitated when 0.1% zinc salt by weight is employed.

Prior to addition of the water-soluble zinc salt to the bacitracin-containing fermentation medium, I acidify the bacitracin-containing fermentation medium if necessary and then following addition of the water-soluble zinc salt, I raise the pH to at least about 5.0 and preferably within the range 6.5 to 7.5. Since bacitracin is unstable at alkaline pH's and since the losses are high at pH 9.0 and above, I avoid adjusting the pH to a value above this figure. Appreciable precipitation of the zinc bacitracin does not occur until the pH is adjusted to a value of at least about 6.0 and I have found that by adjustment of the pH to a value within the range 6.5 to 7.5, I can avoid excessive losses of bacitracin from decomposition and insure essentially complete precipitation of the bacitracin present as zinc bacitracin.

When the zinc bacitracin is employed with a dried fermentation residue of a culture of a bacitracin-producing strain of Bacillus subtilis, no additional nutrient diluent is necessary to facilitate subsequent mixing of the feed supplement in a finished feed; however, I prefer to employ a nutrient diluent in order to standardize the zinc bacitracin content of the supplement. Additional nutrient materials also can be added to the mixture to improve the nutritional quality of the supplement and, in particular, materials which I prefer to add include those having a growth-promoting effect such as, for example, vitamin $B_{12}$.

The following example is offered to illustrate the production of our new zinc bacitracin feed supplement; however, I do not intend to be limited to the particular proportions, materials, etc., which are shown. Rather I intend to include within the scope of this invention all equivalents which would be obvious to those skilled in the art.

EXAMPLE I

A 58-gallon portion of bacitracin-containing nutrient fermentation medium was acidified to pH 5.0 with hydrochloric acid and sufficient zinc chloride then added to make a 1% solution. The pH was then raised to 6.8–7.0 with dilute sodium hydroxide. Precipitated zinc bacitracin and water-insoluble solids in the nutrient fermentation medium were then filtered therefrom. The bacitracin-containing nutrient fermentation medium contained 105 units of bacitracin per ml. while the zinc bacitracin filter cake weighing 69 pounds, contained 707 units of bacitracin per gram. The filtrate amounting to 44 gallons contained 6 units of bacitracin per ml. The filtrate was then concentrated to obtain a concentrate amounting to 2.6 gallons containing 28 units of bacitracin per ml. This concentrate was then added to the filter cake and the resulting sludge dried on a rotary drum drier to obtain a zinc bacitracin feed supplement amounting to 19.3 pounds and containing 1,950 units of bacitracin as zinc bacitracin per gram of feed supplement. The overall recovery of bacitracin activity amounted to 78.6%.

As indicated above, my new zinc bacitracin feed supplement possesses an increased thermal stability over a similar feed supplement containing ordinary bacitracin. Several stability tests were conducted comparing our new zinc bacitracin feed supplement obtained as described in Example I and mixed with a complete chick ration and a similar feed mixture containing a similarly obtained ordinary bacitracin feed supplement mixed with the same chick ration. The chick ration with which the feed supplements were mixed had the following composition:

Chick ration

| Ingredient | Amount/Ton |
| --- | --- |
| Yellow corn | 1,200 lbs. |
| Wheat middlings | 100 lbs. |
| Oats | 20 lbs. |
| Soybean meal, 50% | 480 lbs. |
| Fish meal-menhaden, 60% | 60 lbs. |
| Dehydrated alfalfa meal, 17% | 50 lbs. |
| Steamed bone meal | 50 lbs. |
| $CaCO_3$ | 20 lbs. |
| Salt, plain | 10 lbs. |
| Riboflavin supplement | 1 lb. |
| Calcium pantothenate | 5 grams. |
| Choline Supplement, 25% | 4 lbs. |
| Niacin | 16 grams. |
| Vitamin A and D Supplement | 2 lbs. |
| Manganese sulfate | 180 grams. |
| Methionine | 1 lb. |
| Vitamin $B_{12}$ Supplement | 0.5 lb. |

The results of three-month thermal stability tests under controlled humidity conditions comparing the zinc bacitracin feed supplement with the ordinary bacitracin feed supplement are shown in the following table. The results are expressed in percent of original bacitracin activity after storage for three months at the temperature and humidity conditions shown.

Table I

| Ration Plus Supplement shown | 25° C. | | | 40° C. | | |
| --- | --- | --- | --- | --- | --- | --- |
| | 30% RH | 60% RH | 80% RH | 30% RH | 60% RH | 80% RH |
| Zinc bacitracin | 104 | 92 | 79 | 96 | 66 | 49 |
| Bacitracin | 98 | 71 | 23 | 72 | 27 | |

RH = relative humidity.

Chick feeding tests were conducted to determine the growth-promoting effect of my new zinc bacitracin feed supplement. Zinc bacitracin feed supplement was mixed with the balanced chick ration given above in amounts as shown in the following table. The resulting mixture was then fed to one lot of 40 chicks at each level (amount) of feed supplement tested. The results are shown in the following table and are compared with the results of a similar chick feeding test wherein the chicks were fed the balanced chick ration given above without the added supplement. The chicks were started on the tests the day they were hatched and continued on the test for 30 days.

Table II

| Supplement Added | Gms. Zn Bacitracin/ton | Average Chick Weights (Gms.) | | |
| --- | --- | --- | --- | --- |
| | | Females | Males | Sexed |
| None | | 279 | 299 | 289 |
| Zinc Bacitracin | 10 | 274 | 333 | 304 |
| Do | 50 | 294 | 338 | 316 |
| Do | 250 | 290 | 329 | 309 |

Now having disclosed my invention, what I claim is:

1. An antibiotic feed supplement comprising the zinc salt of the antibiotic bacitracin and a nutrient diluent therefor.

2. An antibiotic feed supplement comprising a mixture of zinc bacitracin and dried fermentation residue from the culture of a bacitracin-producing strain of the organism *Bacillus subtilis* in liquid nutrient media.

3. A process for the production of a zinc bacitracin animal feed supplement which comprises acidifying the product of fermentation of a bacitracin-producing strain of the organism *Bacillus subtilis* in a liquid nutrient medium, adding a water-soluble zinc salt to the acidified fermentation product, precipitating zinc bacitracin from the acidified fermentation product by adjusting the pH of the mixture to about 6.0–9.0, separating the entire suspended solids from the resulting slurry and drying the separated solids.

4. A process for the production of a zinc bacitracin animal feed supplement which comprises acidifying the product from the fermentation of a bacitracin-producing strain of the organism *Bacillus subtilis*; adding a water-soluble zinc salt to the acidified fermentation product, precipitating zinc bacitracin from the acidified fermentation product by adjusting the pH of the mixture to about 6.0–9.0, separating the entire suspended solids from the resulting slurry, concentrating the resulting solid-free liquid, adding the concentrated liquid to the solid previously separated therefrom, and drying the resulting mixture.

References Cited in the file of this patent

Anker et al.: J. Bact. 55, February 1948, page 254.

Buyer's Guide—Baciferm—5, December 14, 1950, 2 pages.

Fed. Reg., November 21, 1953, pages 7382–4.